(12) United States Patent
Tenorio

(10) Patent No.: US 9,990,633 B2
(45) Date of Patent: *Jun. 5, 2018

(54) PROVIDING MARKET FEEDBACK ASSOCIATED WITH ELECTRONIC COMMERCE TRANSACTIONS TO SELLERS

(75) Inventor: Manoel Tenorio, Mountain View, CA (US)

(73) Assignee: JDA Software Group, Inc., Scottsdale, AZ (US)

( * ) Notice: Subject to any disclaimer, the term of this patent is extended or adjusted under 35 U.S.C. 154(b) by 1378 days.

This patent is subject to a terminal disclaimer.

(21) Appl. No.: 11/877,825

(22) Filed: Oct. 24, 2007

(65) Prior Publication Data

US 2008/0046273 A1  Feb. 21, 2008

Related U.S. Application Data

(63) Continuation of application No. 09/892,300, filed on Jun. 26, 2001, now Pat. No. 7,330,829.

(51) Int. Cl.
  *G06Q 10/00* (2012.01)
  *G06Q 30/00* (2012.01)
  *G06Q 30/02* (2012.01)
  *G06Q 30/06* (2012.01)

(52) U.S. Cl.
  CPC ......... *G06Q 30/00* (2013.01); *G06Q 30/0201* (2013.01); *G06Q 30/0625* (2013.01)

(58) Field of Classification Search
  CPC ........... G06Q 30/0601; G06Q 30/0641; G06Q 30/06; G06Q 30/02; G06Q 30/0633
  USPC ....................................................... 705/26.1
  See application file for complete search history.

(56) References Cited

U.S. PATENT DOCUMENTS

| 3,961,164 | A | 6/1976 | Reed et al. |
| 5,347,632 | A | 9/1994 | Filepp et al. |
| 5,564,043 | A | 10/1996 | Siefert |
| 5,642,419 | A | 6/1997 | Rosen |

(Continued)

OTHER PUBLICATIONS

Brucks, M., "Search Monitor: An Approach for Computer-Controlled Experiments Involving Consumer Information Search", (Jun. 1988) Journal of Consumer Research: vol. 15, pp. 117-121.*

(Continued)

*Primary Examiner* — Tiphany B Dickerson
(74) *Attorney, Agent, or Firm* — Spencer Fane LLP; Steven J. Laureanti

(57) ABSTRACT

An electronic commerce system providing market feedback to sellers includes a server. The server records query information associated with a search query for a buyer of one or more databases containing product data and also records presentation information associated with presentation of multiple search results to the buyer, each search result including data for a product matching one or more search criteria specified in the search query, the search results including one or more search results reflecting product data for a particular seller. The server also records selection information associated with selection by the buyer of a particular search result from among the multiple search results and also provides at least some of the recorded query information, presentation information, or selection information to the particular seller to allow the particular seller to assess one or more aspects of its product data relative to product data of other sellers.

30 Claims, 4 Drawing Sheets

(56) References Cited

U.S. PATENT DOCUMENTS

| | | | |
|---|---|---|---|
| 5,694,546 A | 12/1997 | Reisman | |
| 5,721,832 A | 2/1998 | Westrope et al. | |
| 5,727,129 A | 3/1998 | Barrett et al. | |
| 5,790,677 A | 8/1998 | Fox et al. | |
| 5,870,473 A | 2/1999 | Boesch et al. | |
| 5,918,229 A | 6/1999 | Davis et al. | |
| 5,926,797 A | 7/1999 | Goodwin, III | |
| 5,935,207 A | 8/1999 | Logue et al. | |
| 5,950,173 A * | 9/1999 | Perkowski | 705/27.1 |
| 5,963,134 A | 10/1999 | Bowers et al. | |
| 5,970,471 A | 10/1999 | Hill | |
| 5,987,233 A | 11/1999 | Humphrey | |
| 6,006,218 A | 12/1999 | Breese et al. | |
| 6,038,668 A | 3/2000 | Chipman et al. | |
| 6,049,673 A | 4/2000 | McComb et al. | |
| 6,078,891 A | 6/2000 | Riordan et al. | |
| 6,101,515 A | 8/2000 | Wical et al. | |
| 6,105,134 A | 8/2000 | Pinder et al. | |
| 6,128,600 A | 10/2000 | Imamura et al. | |
| 6,128,624 A | 10/2000 | Papiemiak et al. | |
| 6,144,996 A | 11/2000 | Starnes et al. | |
| 6,154,738 A * | 11/2000 | Call | G06Q 20/201 705/20 |
| 6,189,043 B1 | 2/2001 | Buyukkoc et al. | |
| 6,192,131 B1 | 2/2001 | Geer, Jr. et al. | |
| 6,199,082 B1 | 3/2001 | Ferrel et al. | |
| 6,212,512 B1 | 4/2001 | Barney et al. | |
| 6,236,975 B1 | 5/2001 | Boe et al. | |
| 6,236,978 B1 | 5/2001 | Tuzhilin | |
| 6,271,846 B1 | 8/2001 | Martinez et al. | |
| 6,285,366 B1 | 9/2001 | Ng et al. | |
| 6,286,002 B1 * | 9/2001 | Axaopoulos et al. | 705/26.8 |
| 6,289,382 B1 | 9/2001 | Bowman-Amuah | |
| 6,324,522 B2 * | 11/2001 | Peterson et al. | 705/28 |
| 6,334,131 B2 | 12/2001 | Chakrabarti et al. | |
| 6,336,112 B2 | 1/2002 | Chakrabarti et al. | |
| 6,336,910 B1 | 1/2002 | Ohta et al. | |
| 6,341,280 B1 | 1/2002 | Glass et al. | |
| 6,343,275 B1 * | 1/2002 | Wong | 705/26.1 |
| 6,343,287 B1 | 1/2002 | Kumar et al. | |
| 6,356,899 B1 | 3/2002 | Chakrabarti et al. | |
| 6,366,910 B1 | 4/2002 | Rajaraman et al. | |
| 6,370,527 B1 | 4/2002 | Singhal | |
| 6,415,320 B1 * | 7/2002 | Hess et al. | 709/219 |
| 6,460,038 B1 | 10/2002 | Khan et al. | |
| 6,466,240 B1 | 10/2002 | Maslov | |
| 6,466,918 B1 | 10/2002 | Spiegel et al. | |
| 6,476,832 B1 | 11/2002 | Park | |
| 6,489,968 B1 | 12/2002 | Ortega et al. | |
| 6,490,567 B1 | 12/2002 | Gregory | |
| 6,490,619 B1 | 12/2002 | Byrne et al. | |
| 6,520,820 B2 | 2/2003 | Kubota | |
| 6,532,481 B1 | 3/2003 | Fassett, Jr. | |
| 6,553,364 B1 | 4/2003 | Wu | |
| 6,581,072 B1 | 6/2003 | Mathur et al. | |
| 6,591,252 B1 | 7/2003 | Young | |
| 6,609,129 B1 * | 8/2003 | Luh | G06F 17/30607 707/797 |
| 6,745,177 B2 | 6/2004 | Kepler et al. | |
| 6,763,356 B2 | 7/2004 | Borchers | |
| 6,778,982 B1 * | 8/2004 | Knight et al. | 707/737 |
| 6,778,991 B2 | 8/2004 | Tenorio | |
| 6,810,395 B1 * | 10/2004 | Bharat | |
| 6,873,982 B1 * | 3/2005 | Bates et al. | 707/737 |
| 6,963,867 B2 | 11/2005 | Ford et al. | |
| 6,983,276 B2 | 1/2006 | Tenorio | |
| 7,076,453 B2 | 7/2006 | Jammes et al. | |
| 7,127,416 B1 * | 10/2006 | Tenorio | 705/26.62 |
| 7,162,453 B1 | 1/2007 | Tenorio | |
| 7,263,515 B1 | 8/2007 | Tenorio | |
| 2001/0014868 A1 * | 8/2001 | Herz et al. | 705/14 |
| 2001/0032162 A1 | 10/2001 | Alsberg et al. | |
| 2001/0034814 A1 | 10/2001 | Rosenzweig | |
| 2001/0044751 A1 | 11/2001 | Pugliese, III et al. | |
| 2001/0056395 A1 * | 12/2001 | Khan | G06Q 20/00 705/37 |
| 2002/0026386 A1 | 2/2002 | Walden | |
| 2002/0032597 A1 | 3/2002 | Chanos | |
| 2002/0046187 A1 | 4/2002 | Vargas et al. | |
| 2002/0082932 A1 | 6/2002 | Chinnappan | |
| 2002/0082945 A1 | 6/2002 | Tenorio | |
| 2002/0083048 A1 * | 6/2002 | Tenorio et al. | 707/2 |
| 2002/0111870 A1 | 8/2002 | Chinnappan | |
| 2002/0123955 A1 | 9/2002 | Andreski et al. | |
| 2002/0147656 A1 * | 10/2002 | Tam et al. | 705/26 |
| 2002/0156688 A1 * | 10/2002 | Horn et al. | 705/26 |
| 2002/0174022 A1 | 11/2002 | Tenorio | |
| 2003/0033205 A1 | 2/2003 | Nowers et al. | |
| 2003/0195877 A1 * | 10/2003 | Ford et al. | 707/3 |

OTHER PUBLICATIONS

Davidson, A., "Producing a Winning Web Site", (May/Jun. 1999), Ivey Business Journal: vol. 63, Iss. 4, p. 10.*

Paper, D., & Tingey, K. B. (2001). Realizing Frictionless Global E-Commerce. Journal of Information Technology Cases & Applications, 3(1), 1-8. (Year: 2001).*

Schrooten, R., & Van De Velde, W. (1997). Software Agent Foundation for Dynamic Interactive Electronic Catalogs. Applied Artificial Intelligence, (5). 459 (Year: 1997).*

AT&L Knowledge Sharing System "Ask a Professor—Question & Answer Detail", 2 pages.

Unknown, "website2Go Commerce User Guide, Shopping Cart Online Help", webshop2Go User Guide, http://web.archive.org/web/20000824163512/http://shopguide.website2go.com/, 2 pages, May 27, 2003.

Unknown, "1998-1999 Database Seminar Series", Uoft Data Base Group, Database Seminar, http://www.cs.toronto.edu/DB/main/seminars98.html, 4 pages, May 27, 2003.

Unknown, "Pars International parleys its sales automation strengths into E-Commerce leadership using Java and IBM San Francisco", IBM Press Release Sep. 1998, Pars.com—IBM Press Release Sep. 1998, http://www.pars.com/Ultra/IBMPressRelease.htm, 3 pages, May 27, 2003.

Unknown, "ONYX Internet Ltd, The Challenge", eBusiness Innovation Awards 1999, http://www.ecommerce-awards.com/awards2000/winners/1998/finalists/onyx.html, 2 pages, May 28, 2003.

Unknown, "eBay-Your Personal Trading Community", http://web.archive.org/web/19990117033159/pages.ebay.com/aw/index.html, About eBay, SafeHarbor, Bookmarks eBay Store, Go Global!, 9 pages (last updated Jan. 16, 1999), May 28, 2003.

Unknown, "Welcome to Amazon.com", Amazon.com—Earth's Biggest Selection, http://web.archive.org/web/19991013091817/http:amazon.com. 6 pages, May 23, 2003.

Unknown, "Northern Light Search", http://web.archive.org/web/19980206192654/http://www.northernlight.com, 18 pages, May 28, 2003.

Tracy Marks, "Lesson Two: My Computer and Explorer continued, G. Explorer: Orientation," Windows 95 manual, Lesson 2, Using Explorer, Copying Files, http://www.windweaver.com/w95man2g.htm, 4 pages (copyright 1996, '96, '97), May 23, 2003.

Unknown, "Sample Full Hit Highlighting Form, Query i2 against document /news/1690.asp", Microsoft Index Server, http://www.industryweek.com/issamples/issamples/oop/qfullhit.ntw?CiWebHitsFile=%2Fnews, 2 pages, Dec. 3, 2001.

Unknown, "Sample Full Hit Highlighting Form, Query tradematrix again document/columns/text/689.asp", Microsoft Index Server, http://www.industryweek.com/issamples/issamples/oop/qfullhit.htwCiWebHitsFile=%2Fcolum, 2 pages, Dec. 3, 2001.

PCT Notification of transmittal of the International Search Report or the Declaration, 3 pages, dated Dec. 25, 2001.

PCT Notification of Transmittal of the International Search Report or the Declaration, 3 pages, dated Dec. 23, 2001.

U.S. Appl. No. 09/859,266, entitled "Facilitating Electronic Commerce Transactions Using a Shared Product Data Repository", filed May 16, 2001, 39 pages.

(56) References Cited

OTHER PUBLICATIONS

U.S. Appl. No. 09/892,300, entitled "Providing Market Feedback Associated with Electronic Commerce Transactions to Sellers", filed Jun. 26, 2001, 43 pages.
U.S. Appl. No. 09/895,525, entitled "Association of Data with a Product Classification Schema", filed Jun. 28, 2001, 50 pages.
U.S. Appl. No. 09/895,490, entitled "Third Party Certification of Content in Electronic Commerce Transactions", filed Jun. 29, 2001, 42 pages.
U.S. Appl. No. 09/895,489, entitled "Protecting Content from Unauthorized Reproduction", filed Jun. 29, 2001, 46 pages.

* cited by examiner

FIG. 3

| PID | PRODUCT TYPE | MANUFACTURER | INK COLOR | TIP SIZE | CURRENCIES ACCEPTED | ... | PRICE |
|---|---|---|---|---|---|---|---|
| 23 | BALL POINT | ABC | BLUE | MEDIUM | US DOLLARS | ... | 0.12 |
| 29 | BALL POINT | ABC | BLACK | MEDIUM | US DOLLARS | ... | 0.12 |
| 56 | BALL POINT | XYZ | BLACK | MEDIUM | US DOLLARS | ... | 0.13 |
| 98 | BALL POINT | XYZ | GREEN | . . . | . . . | ... | 0.13 |
| . . . | . . . | . . . | . . . | . . . | . . . | ... | . . . |
| . . . | . . . | . . . | . . . | . . . | . . . | ... | . . . |
| 12 | FELT TIP | XYZ | BLACK | BROAD | US DOLLARS | ... | 0.17 |
| 16 | FELT TIP | ABC | BLACK | BROAD | US DOLLARS | ... | 0.18 |
| 56 | FELT TIP | ABC | RED | FINE | US DOLLARS | ... | 0.16 |
| 123 | FELT TIP | XYZ | RED | FINE | US DOLLARS | ... | 0.16 |
| . . . | . . . | . . . | . . . | . . . | . . . | ... | . . . |
| . . . | . . . | . . . | . . . | . . . | . . . | ... | . . . |
| 2 | ROLLER BALL | XYZ | BLUE | FINE | US DOLLARS | ... | 0.25 |
| 59 | ROLLER BALL | XYZ | BLACK | FINE | US DOLLARS | ... | 0.25 |
| 143 | ROLLER BALL | XYZ | BLACK | MEDIUM | US DOLLARS | ... | 0.22 |
| 456 | ROLLER BALL | ABC | RED | EXTRA FINE | US DOLLARS | ... | 0.29 |
| . . . | . . . | . . . | . . . | . . . | . . . | ... | . . . |
| . . . | . . . | . . . | . . . | . . . | . . . | ... | . . . |

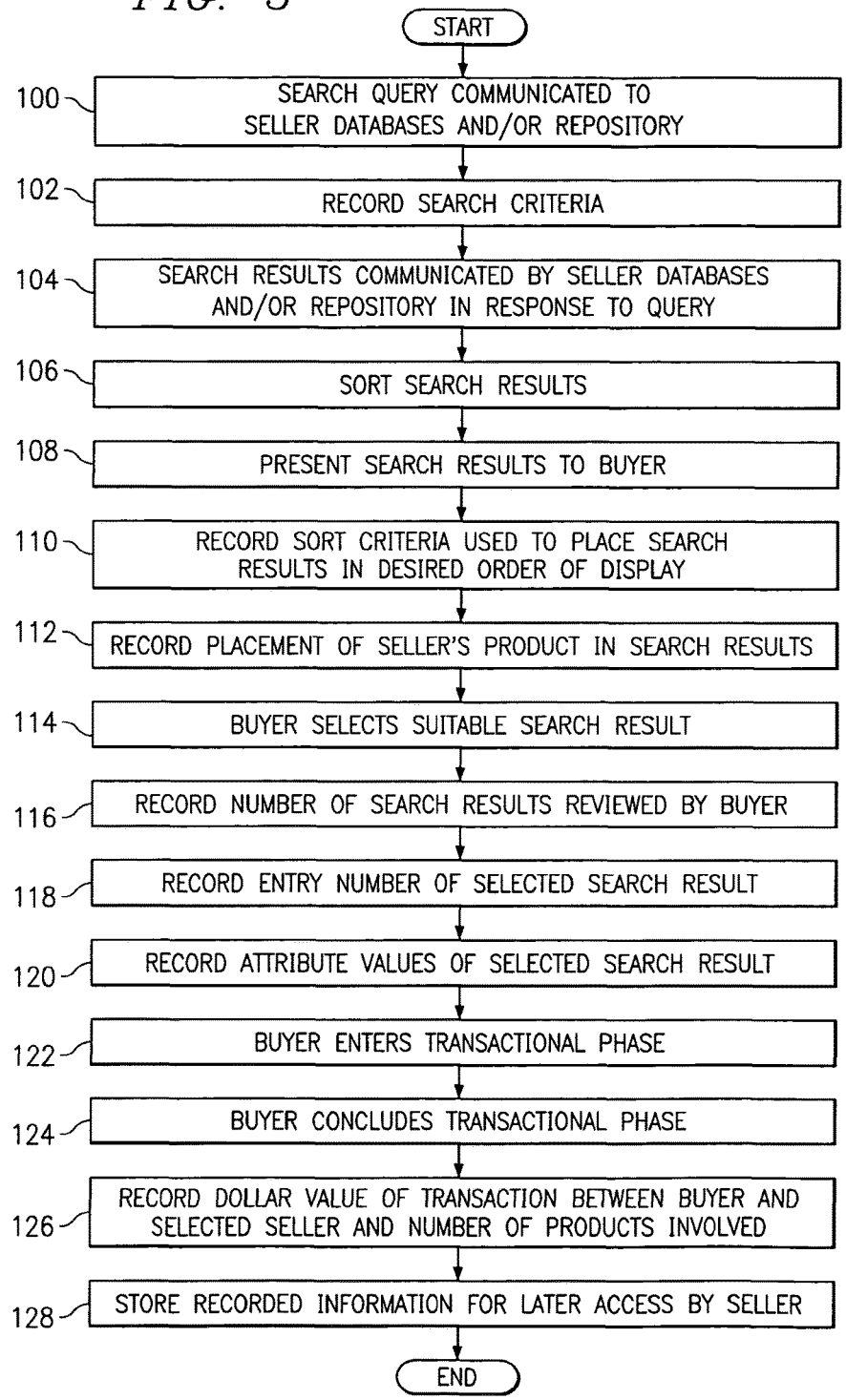

PROVIDING MARKET FEEDBACK ASSOCIATED WITH ELECTRONIC COMMERCE TRANSACTIONS TO SELLERS

CLAIM OF PRIORITY

This application is a continuation of U.S. patent application Ser. No. 09/892,300, filed on 26 Jun. 2001 and entitled "PROVIDING MARKET FEEDBACK ASSOCIATED WITH ELECTRONIC COMMERCE TRANSACTIONS TO SELLERS". U.S. patent application Ser. No. 09/892,300 is commonly assigned to the assignee of the present application. The disclosure of related U.S. patent application Ser. No. 09/892,300 is hereby incorporated by reference into the present disclosure as if fully set forth herein.

BACKGROUND

Technical Field of the Invention

This invention relates to electronic commerce and more particularly to providing market feedback to sellers from electronic-commerce transactions.

Background of the Invention

Due to the ever-increasing popularity and accessibility of the Internet as a medium of communication, the number of business transactions conducted using the Internet is also increasing, as are the numbers of buyers and sellers participating in electronic marketplaces providing a forum for these transactions. The majority of electronic commerce ("e-commerce") transactions occur when a buyer determines a need for a product, identifies a seller that provides that product, and accesses the seller's web site to arrange a purchase of the product. If the buyer does not have a preferred seller or if the buyer is purchasing the product for the first time, the buyer will often perform a search for a number of sellers that offer the product and then access numerous seller web sites to determine which seller offers certain desired product features at the best price and under the best terms for the buyer. The matching phase of e-commerce transactions (matching the buyer with a particular seller) is often inefficient because of the large amount of searching involved in finding a product and because once a particular product is found, the various offerings of that product by different sellers may not be easily compared.

SUMMARY OF THE INVENTION

According to the present invention, disadvantages and problems associated with previous e-commerce techniques have been substantially reduced or eliminated.

In one embodiment of the present invention, an electronic commerce system providing market feedback to sellers includes a server operating on one or more computers. The server records query information associated with a search query for a buyer of one or more databases containing product data. The server also records presentation information associated with presentation of multiple search results to the buyer, each search result including data for a product matching one or more search criteria specified in the search query, the search results including one or more search results reflecting product data for a particular seller. The server also records selection information associated with selection by the buyer of a particular search result from among the multiple search results. The server provides at least some of the recorded query information, presentation information, or selection information to the particular seller to allow the particular seller to assess one or more aspects of its product data relative to product data of other sellers.

Particular embodiments of the present invention may provide one or more technical advantages. For example, certain embodiments of the present invention may provide a seller market feedback regarding the seller's offerings, enabling the seller to more effectively modify the seller's offerings to improve the marketing of the seller's products. Particular embodiments may provide a seller feedback regarding differences between offerings that were not selected by buyers and offerings that were selected by buyers. Such embodiments may allow a seller to better identify aspects of its offerings (such as, for example, product attribute values, seller attribute values, product data quality, and seller data quality) that may be modified to improve the marketing of certain of the seller's products. Particular embodiments may also provide a seller feedback regarding the placement of the seller's offerings relative to other offerings in a set of search results presented to a buyer. Such embodiments may allow a seller to better identify possible changes to aspects of its offerings that may improve the visibility of its offerings relative to other search results presented to a buyer. Particular embodiments may also provide a seller feedback regarding transactions for which the seller was not selected, which may give the seller a "picture" of the marketplace and allow the seller to more effectively focus on particular market segments.

Systems and methods incorporating one or more of these or other technical advantages may be well suited for modern e-commerce environments. Other technical advantages may be readily apparent to those skilled in the art from the following figures, descriptions, and claims.

BRIEF DESCRIPTION OF THE DRAWINGS

To provide a more complete understanding of the present invention and the features and advantages thereof, reference is made to the following description taken in conjunction with the accompanying drawings, in which:

FIG. 3 illustrates an example table of a seller database;

FIG. 5 illustrates an example method for providing a seller market feedback associated with an e-commerce transaction.

DESCRIPTION OF EXAMPLE EMBODIMENTS

Figure 1:
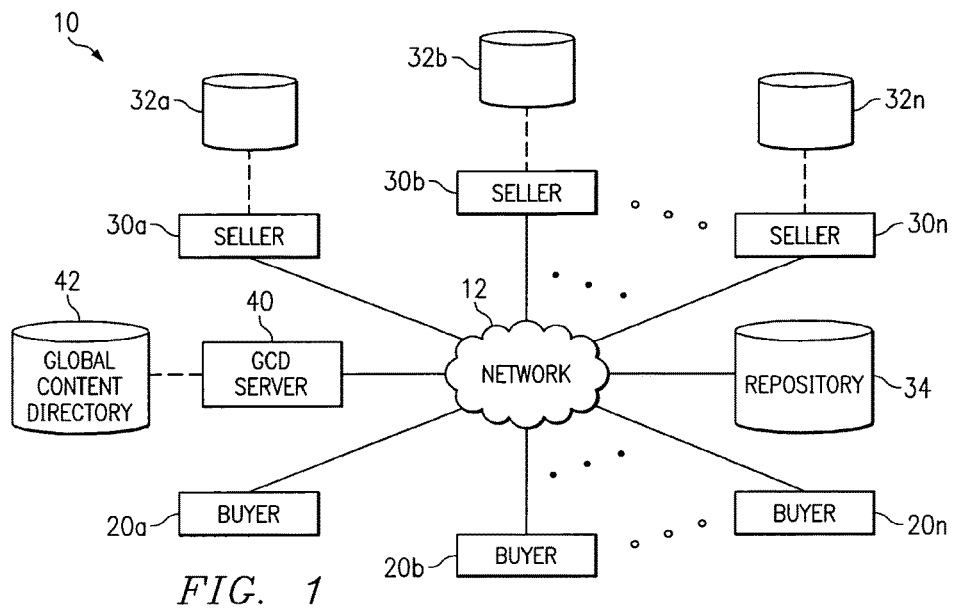
FIG. 1 illustrates an example e-commerce system.

FIG. 1 illustrates an example system 10 that includes a network 12 coupling buyers 20, sellers 30, and a global content directory (GCD) server 40. System 10 enables e-commerce transactions between buyers 20 and sellers 30 through the use of a GCD 42 supported by GCD server 40. Although GCD 42 is shown as being external to GCD server 40, GCD 42 may be internal or external to GCD server 40. Network 12 may include any appropriate combination of public and/or private networks coupling buyers 20, sellers 30, and GCD server 40. In an example embodiment, network 12 includes the Internet and any appropriate local area networks (LANs), metropolitan area networks (MANs), or wide area networks (WANs) coupling buyers 20, sellers 30, and GCD server 40 to the Internet. Since the Internet is accessible to the vast majority of buyers and sellers in the world, the present invention potentially includes all of these buyers and sellers as buyers 20 and sellers 30 associated with system 10. However, the use of the term "global" should not be interpreted as a geographic limitation necessarily requiring that GCD 42 provide directory services to buyers 20 and sellers 30 around the world (or in any other particular region) or that the content of GCD 42 be from all over the world (or from any other particular region).

Although buyers 20 and sellers 30 are described as separate entities, a buyer 20 in one transaction may be a seller 30 in another transaction, and vice versa. Moreover, reference to "buyer" or "seller" is meant to include a person, a computer system, an organization, or other entity where appropriate. For example, a buyer 20 may include a computer programmed to autonomously identify a need for a product, search for that product, and buy that product upon identifying a suitable seller. Although buying and selling are primarily described herein, the present invention contemplates any appropriate e-commerce transaction. Moreover, reference to "products" is meant to include goods, real property, services, information, or any other suitable tangible or intangible things.

A typical e-commerce transaction may involve a "matching" phase and a "transactional" phase. During the matching phase, a buyer 20 may search for a suitable product (meaning any good, real property, service, information, or other tangible or intangible thing that may be the subject of an e-commerce transaction) offered by one or more sellers 30, identify the most suitable seller 30 (which may involve, for example, identifying the seller 30 offering the lowest price), and contact that seller 30 to enter the transactional phase. During the transactional phase, the buyer 20 and seller 30 may negotiate a contract for the sale of the product (which may involve, for example, more clearly defining the subject of the transaction, negotiating a price, and reaching an agreement on supply logistics) and generate a legal document embodying the terms of the negotiated contract. To identify the most suitable seller 30 during the matching phase without the use of GCD 42, a buyer 20 may have to access numerous seller web sites to determine which seller 30 offers certain desired features of the product at the best price. Sellers 30 may each provide one or more databases 32, such as relational databases, that include data identifying the products available from sellers 30 and their features. Each database 32 may be accessed through the associated seller's web site or in any other appropriate manner. The multiple one-to-one (one buyer 20 to one seller 30) searches that this process requires are inefficient and expensive because of the large amount of searching involved in finding a product and because the various offerings of that product by different sellers 30 may not be easily compared.

Alternatively, multiple sellers 30 may be grouped in an electronic marketplace according to the products they provide and a buyer 20 may search the offerings of the multiple sellers 30 at a single web site. However, if buyer 20 wishes to obtain several different types of products, buyer 20 may have to go to several different types of marketplaces. Furthermore, there may be numerous competing marketplaces that buyer 20 has to search to perform the matching phase of a transaction for a particular product. One potential method of addressing this problem is to create a global product database that potentially includes data identifying the features of all the products that any buyer may wish to obtain. Therefore, the global database would include the combined contents of every database 32 associated with every seller 30. However, such a global database would have many problems. For example, the sheer size of the database would make it difficult to search and cause the database to suffer from performance problems. In addition, it would be difficult to allow large numbers of buyers 20 to search the database at once. Furthermore, all sellers 30 would be required to access the global database to update their information and the entire database would have to be updated each time a change is made. Many other problems might also exist.

A solution to the above problems, at least in part, is GCD 42. GCD 42 is a universal directory of the contents of multiple seller databases 32 (and potentially all seller databases 32). GCD 42 may be implemented using one or more servers 40 or other computers located at one or more locations. Most or all of the content in these seller databases 32 remains stored in databases 32, but this content is accessible using GCD 42. Therefore, like the global database described above, GCD 42 provides buyers 20 with access to product data relating to a multitude of products (and potentially seller data relating to one or more sellers 30 of the products), but unlike the global database, GCD 42 does not attempt to store all of this data in one enormous database. Where appropriate, reference to "data" is meant to include product data (meaning information reflecting values for certain attributes of a product), seller data (meaning information reflecting values for certain seller attributes), or both product data and seller data.

GCD 42 provides a directory of products using a directory structure in which products are organized using a hierarchical classification system. A buyer 20 may navigate or search the directory to find a particular product class into which products are categorized. The product data (and potentially seller data) associated with a product included in a product class may actually be stored in and obtained by GCD 42 from a seller database 32. However, the requested data may be transparently provided to buyer 20 such that all of the product data may appear to buyer 20 as being included in GCD 42. Although product and/or seller data has primarily been described as being stored in seller databases 32, the present invention contemplates product data being stored in any suitable manner and being retrieved from any suitable sources. For example, system 10 may include a shared data repository 34 that contains product data and/or seller data that may be combined with data from one or more seller databases 32, as described in further detail below.

Figure 2:
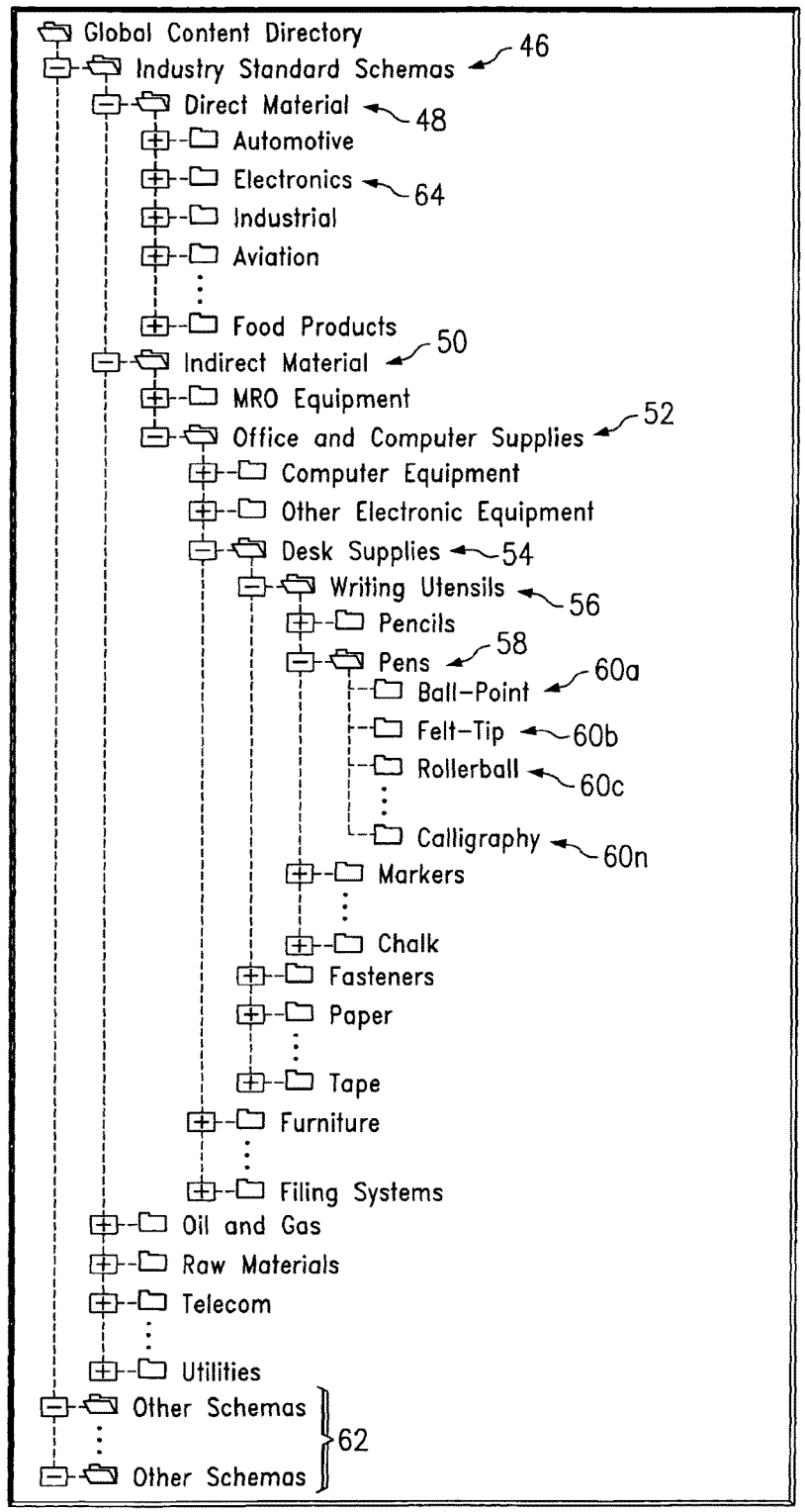
FIG. 2 illustrates an example directory structure of an example global content directory.

FIG. 2 illustrates an example directory structure 44 of an example GCD 30 42. Products categorized in GCD 42 may be organized according to schemas. A schema may include a set of product classes (which may be referred to as a "taxonomy") organized in a hierarchy, each class being associated with a set of product features, characteristics, or other product attributes (which may be referred to as a "product ontology"). For example, pens may have different kinds of tips (such as ball point or felt tip), different tip sizes (such as fine, medium, or broad), and different ink colors (such as blue, black, or red). Accordingly, a schema may include a class corresponding to pens that has a product ontology including tip type, tip size, and color, or other appropriate attributes. Within a class, products may be defined by product attribute values (such as, for example, ball point, medium tip, blue ink). Reference to "value" is meant to include any instance of a product attribute or a seller attribute. Product attribute values and seller attribute values may be represented by numbers, letters, figures, characters, symbols, or other suitable information for describing a product or a seller, respectively. In one embodiment, a product ontology may be divided into entry-required attributes (meaning attributes for which a value has to be provided) and entry-optional attributes (meaning attributes for which a value is optional), and these categories may be further divided into commercial features and design features (or any other suitable divisions).

In addition to a taxonomy and product ontologies, a schema may include a set of attributes for each seller (which may be referred to as a "seller ontology"). Such attributes may include geographic restrictions (such as served markets), currencies accepted by each seller, collaboration tools accepted by each seller, contract terms accepted by each seller, types of contracts accepted by each seller, levels of buyer credit required by each seller, and any other suitable seller attributes. Similar to a products within a product class, sellers offering products within a product class may be defined by seller attribute values corresponding to seller attributes. Accordingly, a schema may include a set of classes, each including one or more products, and each class may be associated with a set of product attributes and a set of seller attributes.

In example directory structure 44, products may be organized and cataloged according to industry standard schemas 46 or other appropriate schemas, as described below. Within industry standard schemas 46, there are two example classes: a direct materials class 48 and an indirect materials class 50. Each of these classes 48 and 50 includes several sub-classes (which may" themselves include sub-classes). Therefore, the numerous classes of directory structure 44 form a "tree-like" hierarchical structure into which products may be categorized. For example purposes, certain portions of directory structure 44 are "expanded" in FIG. 2 to show various levels of classes. The "level" of a class is indicated by the number of other classes between that class and a root class (such as industry standard schemas class 46). For example, indirect material class 50 is at the same level in directory structure as direct material class 48. Indirect material class 50 may include an office and computer supplies class 52, which includes a desk supplies class 54, which includes a writing utensils class 56. Furthermore, writing utensils class 56 includes a pens class 58, which includes numerous pen type classes 60a-60n ("n" indicating that any number of classes 60 may be included in pens class 58). Each of classes 50, 52, 54, 56, 58, and 60 is located at a different level of directory structure 44. A class at any level in directory structure 44 may include one or more subclasses, those sub-classes may include one or more subclasses, and so on, until a desired specificity of categorization is reached. A series of classes from a highest level class (the broadest class) to a lowest level class (the most specific class) may be referred to as a "branch" of directory structure 44. For example, classes 46, 48, 50, 52, 54, 56, 58, and 60b form one branch of directory structure 44.

Although example directory structure 44 may use industry standard schemas 46 as described above, any other appropriate schemas 62 may be used in addition to or instead of industry standard schemas 46. For example, while industry standard schemas 46 may be organized from a seller's viewpoint, other schemas 62 may be used that organize products from a buyer's viewpoint. For example, a buyer 20 may wish to furnish a kitchen of a new house with various products, such as appliances, window treatments, paint, cabinetry, plumbing, dishes, and cooking utensils. Using one schema 62, these products may be organized into a variety of unrelated classes based on certain features of the products (for example, certain kitchen appliances may be categorized in an electronics class 52 of directory structure 44 while paint may be categorized into an industrial class 52). However, another example schema 62 may categorize all such products into a home products class (which may include several classes further categorizing the products, such as a kitchen products class which includes a kitchen appliances class, which includes a refrigerator class, and so on). Therefore, the same product may be included in multiple schemas 62. These alternative schemas may be included in directory structure 44 and may be stored as a part of or separate from GCD 42.

A buyer 20 may navigate through directory structure 44 by expanding or collapsing various classes as desired. For example, FIG. 2 illustrates an expansion of certain classes of directory structure 44 to reach a felt-tip pen class 60b. Once a buyer 20 has navigated to a class that is specific enough for buyer 20 (and/or a class that is at the end of a branch), buyer 20 may perform a search for products within that class. For example, buyer 20 can search for all products in writing utensils class 56 that are blue felt-tip pens having medium tips. Alternatively, if buyer 20 navigates to the end of a branch of directory structure 44, such as felt-tip pen class 60b, GCD 42 may then enable buyer 20 to search for such pens that have blue ink and medium tips (which may reach the same result as the search above).

Buyer 20 may also search for sellers matching one or more seller attribute values within a product class. For example, in addition to searching for all products in writing utensils class 56 that are blue felt-tip pins having medium tips, buyer 20 may search for sellers 30 serving Texas that accept U.S. dollars. Buyer 20 may search for products matching certain product attribute values and sellers matching certain seller attribute values in any appropriate manner. In one embodiment, for example, buyer 20 provides search criteria including both values for product attributes and for seller attributes (search criteria may instead be generated automatically, in whole or in part, as described below), and server 40 searches for products that match the product attribute criteria and are offered by sellers matching the seller attribute criteria. In another embodiment, buyer 20 provides only product attribute values as search criteria, and server 40 limits its search for products matching the product attribute values to databases 32 associated with sellers 30 known to match seller attribute values that buyer 20 may want according to a buyer profile or otherwise.

As described above, in one embodiment, product data (at least product data more detailed than data provided by a taxonomy) and seller data are not stored in GCD 42, but are stored in databases 32. For example, a seller 30 may maintain a relational database 32 that includes a plurality of tables containing product attribute values for a variety of products and seller attribute values for each product, a set of products, or all of the products offered by seller 30. Product data and seller data may be integrated into one or more tables or may be segregated into different tables. Moreover, product data and seller data for a seller 30 may be stored in the same or separate databases. One or more pointers may be associated with each class to identify the location of one or more databases 32 that include product data and/or seller data for products contained in that class or to identify particular data in databases 32. Therefore, GCD 42 may execute a search for products in databases 32 identified by a pointer corresponding to a user-selected (or automatically selected) class. GCD 42 may also return the: network location (such as a uniform resource locator (URL) or other network address) of the database 32 to buyer 20 so that buyer 20 may independently access database 32. Databases 32 may be searched using any appropriate method including, but not limited to, a structured query language (SQL) query.

GCD 42 may be implemented using the lightweight directory access protocol (LDAP), which enables directories to be provided using the tree-like structure described above. However, any other appropriate technique or protocol for creating GCD 42 may alternatively be used and GCD 42 may have any appropriate structure. Furthermore, GCD 42 may be an object-oriented directory (which is also provided by LDAP) such that each class in directory structure 44 includes the attributes of parent classes in which the class is a sub-class. In this embodiment, a product class listed at the end of a branch of the tree structure includes all of the attributes of its parent classes in the branch. Furthermore, each product included in a database 32 may be an object that includes all the attributes of the classes in which the product is included. Thus, when a search is performed from a class at the end of a branch of directory structure 44, the search query may automatically include any appropriate attributes of parent classes of the class.

For example, if a buyer 20 has navigated through directory structure 44 to felt-tip pens class 60b, a search performed by buyer 20 (or by GCD 42 on behalf of buyer 20) from felt-tip pens class 60b may automatically be limited to a search for felt-tip pens and buyer 20 may introduce additional desired search criteria (such as blue ink and medium tip). Therefore, if a database 32 searched includes product data relating to a variety of writing utensils, a search of database 32 may be automatically limited by GCD 42 to only include felt-tip pens within that database 32. Buyer 20 may also identify additional product attribute values and/or seller attribute values as additional search criteria.

When GCD 42 has performed a search of the databases 32 identified by a pointer or pointers associated with a class that buyer 20 has selected (or that has been automatically selected), GCD 42 may return product data and/or seller data associated with one or more products matching the search criteria. GCD 42 may integrate the product data and/or seller data resulting from the search into directory structure 44 so that the data appears to buyer 20 as being part of GCD 42. GCD 42 may alternatively present the results of the search in any other appropriate manner. Each product resulting from the search may be an object which is unique instance of the class in which buyer 20 is searching. Furthermore, each such object (and its location) may be uniquely identified using a numbering scheme corresponding to directory structure 44.

In summary, a buyer 20 may search for a product matching certain product attribute values available from a seller matching certain seller attribute values using GCD 42 and thus eliminate or reduce the need for buyer 20 to individually search numerous seller databases 32 to find the desired product available from a suitable seller. GCD 42 provides access to product and/or seller data relating to these numerous products using directory structure 44, which organizes products using a hierarchical, object-oriented classification system. Buyer 20 may navigate or search directory structure 44 to find a particular classification of products and various information associated with the products within this classification, initiate a search of databases 32 including product and/or seller data relating to a product, and then communicate with an appropriate database 32 through GCD server 40 or otherwise. Such access to vast numbers of products is provided without the requirement that all data about the products and/or sellers be stored in a global database. Instead, this data may be stored in seller databases 32 that can be readily accessed using GCD 42.

One problem that may be associated with the use of the various seller databases 32 is that these databases 32 may include product data about the same class of product (for example, felt-tip pens), but may identify products of that class using different attribute values, may use different names for the same product attribute value, and/or may quantify or distinguish product attribute values differently (using different units of measurement, for example). The same may be true for seller data that may be contained in databases 32. Some of these issues may be solved using translation mechanisms that convert the data into a uniform format used by GCD 42. Alternatively, sellers 30 may create new databases 32 or manually modify existing databases 32 (or may hire a third party to create or modify databases 32) to conform to a uniform standard in anticipation of a database 32 being used in association with GCD 42.

One disadvantage to seller 30 (or a third party) creating data that is appropriate for use with GCD 42 is that the generation of such data is typically expensive and time-consuming. If seller 30 has already created product data (for example, for access by buyers 20 using the seller's web site), seller 30 may be reluctant to repeat the process and expense of recreating, expanding, reformatting, translating, or otherwise modifying existing product data into a format appropriate for use with GCD 42. However, if seller 30 does not properly format its product data and instead uses a preexisting data format in conjunction with GCD 42, the seller's product data may not be properly associated with GCD 42 and seller 30 may be disadvantaged during the matching phase of a transaction. For example, if the product ontology associated with pens class 58 in directory structure 44 includes ink color as a product attribute and seller 30 does not have this information in its product data or does not refer to this information as "ink color" in its database 32, then a search conducted using GCD 42 for pens having a particular ink color may not properly identify products in database 32 that meet the search criteria. Alternatively, the seller's products may be identified in the search results, but may be ranked lower in the search results since seller 30 does not provide information about the ink color or does provide the information but does not format the information appropriately for use with GCD 42.

One solution to the above problem is to provide a shared product data repository 34 that includes product data relating to numerous common products and which is properly formatted and complete for use with GCD 42. The product data in repository 34 may be made available, for a fee or otherwise, to sellers 30 who do not 30 wish to create (or pay a third party to create) product data for use with GCD 42 or recreate, expand, reformat, translate, or otherwise modify existing product data for use with GCD 42. As an example only, although hundreds of sellers 30 participating in system 10 may sell pens, there may be only a few manufacturers that make the pens sold by sellers 30. Therefore, it may be more efficient and cost effective for the manufacturers to create much of the product data for the pens that they produce and provide this data in repository 34 instead of each seller 30 creating redundant product 5 data for the pens. Alternatively, the product data in repository 34 may be created by an entity associated with GCD 42 or any other appropriate entity.

Product data relating to a particular product that is not seller-specific and/or that changes relatively infrequently (compared to "dynamic" product data, described below) may be created by the manufacturer or another entity and stored in repository 34 for use by sellers 30. This data may be referred to as "static" product data. Examples of static product data relating to a pen may include data relating to ink color, tip type, and tip size of the pen. Other product data relating to a product that is seller-specific and/or that changes relatively frequently (compared to "static" product data) may be created by sellers 30 and stored in seller databases 32. This data may be referred to as "dynamic" product data. Examples of dynamic product data relating to a pen may include data relating to the price, availability, and lead time associated with the pen. Optimally, the combination of the static and dynamic data relating to a particular product will include values for each of the product attributes included in the product ontology of the classes of GCD 42 in which the product is classified. For example, pens class 58 in GCD 42 may have an associated product ontology that includes ink color, tip type, tip size, price, availability, and lead time attributes. Preferably the combination of static product data in repository 34 and dynamic product data in a seller database 32 relating to the pen includes values for each of these product attributes.

When a seller 30 wishes to sell a product using GCD 42, the seller 30 may first determine whether repository 34 includes static product data for the product. Seller 30 may obtain information regarding what product data is included in repository 34 by querying GCD server 40, by querying an entity associated with the repository 34, by directly accessing repository 34, or using any other appropriate 30 technique. If static data for the particular product or products is included in repository 34, then seller 30 may request that the static product data be associated with seller 30 and one or more of its products. As described above, one or more pointers may be associated with each class to identify the location of one or more seller databases 32 that include product data for products contained in that class or to identify particular data in databases 32. In addition, pointers associated with a class may identify the location of a repository 34 and may identify particular data in repository 34. Furthermore, one or more pointers to repository 34 may be linked to one or more pointers to a seller database 32 such that the information from the seller database 32 and repository 34 may be merged. Alternatively, the static product data in repository 34 may be linked with one or more sets of dynamic product data in one or more seller databases 32. Dynamic product data from seller database 32 may be merged with static product data from repository 34 and the combined data may be provided to a buyer 20 as a result of a product search, as is described in further detail below with reference to FIG. 5.

Although repository 34 is illustrated as a single storage location, repository 34 may include multiple storage locations at the same or different physical locations. Any appropriate number of storage locations located in a number of physical locations may be used (for example, the storage locations may be distributed in various geographic regions). GCD server 40 may search each of these distributed repositories 34 as appropriate to obtain static product data that is responsive to a buyer's search. Alternatively, pointers associated with a class may direct GCD server 40 to one or more particular storage locations. In addition, if multiple repositories 34 are used, each repository 34 may include identical product data, some common and some different product data, or entirely different product data. Furthermore, repository or repositories 34 may store the product data in any appropriate format using any appropriate storage medium. Moreover, it should be noted that although shared product data repository is described as including static product data, seller databases 32 may also include static product data. This static product data mayor not be made available to buyers 20 using GCD 42.

FIG. 3 illustrates an example table 150 that may be included in a seller database 32 and/or repository 34. Database 32 and repository 34 may include one or more tables 150, and each table 150 may contain data relating to one or more products. For example, example table 150 includes data relating to different types of pens. Table 150 may also include data for other types of products (for example, other types of office supplies), or such data may be contained in other tables 150 in database 32 and/or repository 34. Table 150 includes a plurality of columns 152 that each include data relating to a particular product attribute or seller attribute. Although an example number of columns 152 including example product attribute values and seller attribute values are illustrated, it should be understood that any appropriate number and type of product attributes, seller attributes, or other categories of data may be included in table 150. Moreover, as described briefly above, seller data and product data may be segregated into different tables instead of being integrated into the same table as shown in example table 150.

Table 150 also includes a number of rows 154 that may each correspond to a particular product and that each include values for one or more of the product attributes and seller attributes. Each of the values (which may be numeric, textual, or in any other appropriate format) is located at the intersection of the row 154 associated with a particular product and the column 152 that includes a particular product attribute or seller attribute. Each of these intersections may be referred to as a field or cell 156 of table 150. Where seller data and product data are integrated, each row 154 may contain all of the product data and seller data for the product corresponding to that row 154. Alternatively, there may be a row or set of rows dedicated to seller data that may apply to all products offered by a seller 30 or a subset of all such products. Where seller data and product data are segregated, each row in the seller data table may correspond to a set of seller attribute values that may be linked to a set of one or more products in the product data table such that seller data for a product may be accessed when product data for that product is accessed, and vice versa.

The data in one or more columns 152 of table 150 may be indexed to increase the speed with which database reads may be conducted. For example, the fields 156 of ink color column 152d and tip size column 152e may be indexed so that a database query for a pen having a particular ink color and tip size may be quickly performed. Data in table 150 may be indexed using any appropriate database indexing technique. The typical result of such indexing is that when GCD 42 or a buyer 20 requests indexed data from a database 32 and/or repository 34, the associated database management system (or other appropriate interface to database 32 and/or repository 34) does not have to search through every field 156 in the tables 150 included in database 32 and/or repository 34 to locate the requested data. Instead, the data may be indexed such that when a query is submitted for products having certain product attribute values and/or sellers 30 having certain seller attribute values that have been indexed, the database management system already knows the locations of such products in table 150 and may return data associated with these products without searching the entire table 150 or database 32 and/or repository 34 for the products. For example, if the ink color fields 156 and tip size fields 156 of columns 152d and 152e, respectively, are indexed, the index will typically identify the location of all products having black ink and a medium tip size.

If a query is submitted that also specifies a value of one or more non-indexed product attributes (for example, a query for pens manufactured by ABC Company, if the manufacturer fields 156 in column 152c are not indexed)

and/or seller attributes, then the associated database management system may perform a search of database 32 and/or repository 34 for products that include the specified value of the one or more non-indexed attributes or seller attributes. However, such a search may be limited to the products already identified (using the index) as including specified values of indexed attributes (for example, pens having black ink and a medium tip) and/or seller attributes that are also included in the search. Therefore, the amount of time required to perform the search may be reduced even though one or more of the product attribute values or seller attribute values that are searched for are not indexed.

Figure 4:
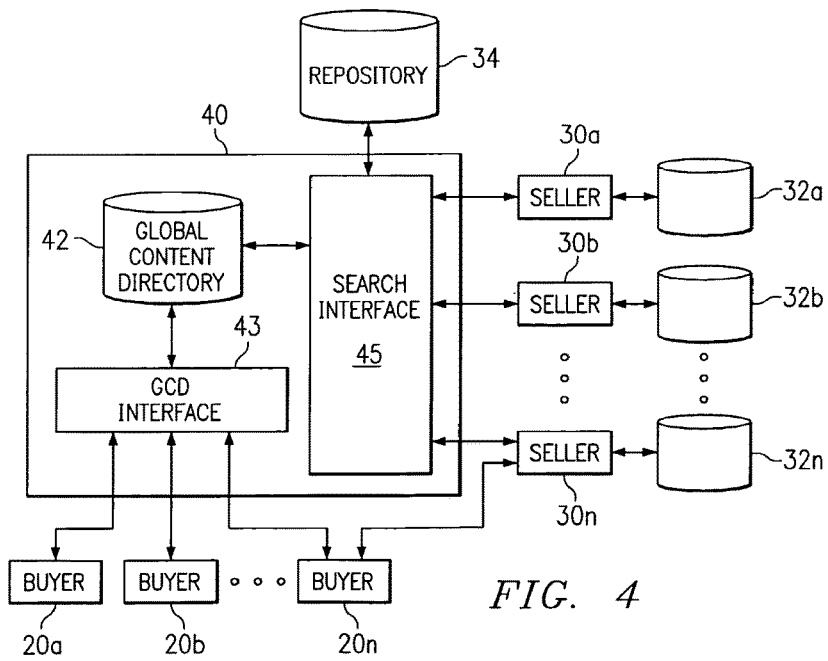
FIG. 4 illustrates an example e-commerce system in further detail.

FIG. 4 illustrates an example e-commerce system 10 in further detail. As described above, numerous buyers 20 and sellers 30 may be coupled to GCD server 40 using network 12. Buyers 20 may access server 40 using a web browser or in any other appropriate manner and server 40 may provide buyers 20 with access to GCD 42 using a web server or in any other appropriate manner. Although GCD 42 is shown as being internal to GCD server 40, GCD 42 may be internal or external to GCD server 40, as described above. GCD server 40 may also include hardware and/or software for implementing one or more GCD interfaces 43. A buyer 20 may access server 40 and use a GCD interface 43 to search or navigate GCD 42 and/or seller databases 32. Information may be communicated among buyers 20, sellers 30, and GCD 42 using hypertext transport protocol (HTTP), extensible markup language (XML), simple object access protocol (SOAP), or any other suitable communication technique. Each buyer 20 and seller 30 may be issued a unique identifier so that the participants in a transaction facilitated by GCD 42 may be identified. Each buyer 20 and seller 30 may also be assigned a role with respect to a transaction. As described above, a buyer 20 in one transaction may be a seller 30 in another transaction, and vice versa.

In an example transaction, a buyer 20 may access a GCD interface 43 and perform a search of GCD 42. GCD interface 43 may allow buyer 20 to both navigate or "browse" the classes of GCD 42 and to search for a particular class or classes. For example, buyer 20 may either navigate GCD 42 to find a class into which pens are categorized or buyer 20 may search GCD 42 for class names including the word "pen." Any other suitable methods for identifying a particular class may also be used. When buyer 20 has located the appropriate class for the product buyer 20 desires, buyer 20 may then request a listing of products in that class matching certain product attribute values. For example, if buyer 20 is browsing felt-tip pens class 60b, buyer 20 may request all products in class 60b (felt-tip pens) that have red ink and a fine tip and that are sold by a seller 30 located in the United States.

A search interface 45, or any other appropriate component of GCD server 40, may facilitate such a request by searching or requesting searches of repository 34 and/or seller databases 32 identified by one or more pointers associated with felt-tip pens class 60b, as described above. Search interface 45 may provide buyer 20 a search form in which to enter one or more search criteria. The types of search criteria that may be used may be identified in the search form, or buyer may be allowed to perform a general search of databases 32 and/or repository 34 for certain terms. For example, search interface 45 may provide buyer 20 with a search form tailored for class 60b that includes fields where buyer 20 can specify a desired ink color, tip thickness, or any other appropriate product-related or seller-related criteria. In one embodiment, the fields of the search form correspond to some or all of the product attributes within the product ontology and/or seller attributes within the seller ontology corresponding to the product class that has been selected, and buyer 20 may enter values for the product attributes and seller attributes in the corresponding search form fields. In lieu of a search form, search interface 45 may instead provide a single field where buyer can enter in desired search terms, such as "red" and "fine" (multiple search terms may be entered using Boolean operators or any other appropriate technique).

Search interface 45, or any other appropriate component of GCD server 40, may also facilitate search requests by accessing a buyer profile for buyer 20 containing information compiled from previous search requests made by buyer 20, previous e-commerce transactions involving buyer 20, or other events or actions on the part of buyer 20. For example, a buyer profile may contain a list of sellers 30 matching seller attribute values that buyer 20 may want. Such a list may be compiled from the results of previous searches by buyer 20. Search interface 45 may access the profile for buyer 20 for any suitable purpose. In one embodiment, search interface 45 may access the profile for buyer 20 to automatically generate search criteria, such as product attribute values and/or seller attribute values, for a search. Search interface 45 may also access the profile for buyer 20 to limit its search for products matching product attribute values provided by buyer 20 (or generated automatically) to databases 32 associated with sellers 30 known to match seller attribute values that buyer 20 may want (and/or data in repository 34 associated with such sellers 30).

Based on search criteria provided by buyer 20 or generated automatically, search interface 45 may communicate a query to the appropriate seller database(s) 32 and/or repository 34 requesting that databases 32 and/or repository 34 each return a listing of all products (including associated product data and/or seller data) that meet the search criteria. Databases 32 and/or repository 34 may also return data relating to attribute values that were not included in the search criteria. For example, databases 32 may return a price and availability for products that meet the search criteria even if price and availability were not search criteria. Responses to the queries of databases 32 and/or repository 34 (which may be referred to as "search results") may be displayed to buyer 20 in any appropriate manner. In one embodiment, search results are communicated directly to buyer 20 from databases 32 and/or repository 34. In another embodiment, GCD 42 lists search results in order of relevance to the search criteria according to suitable matching criteria and presents the results to buyer 20. GCD 42 may also sort the search results according to one or more "default" sort criteria, a sort request made by buyer 20, or one or more buyer preferences recorded in a buyer profile associated with buyer 20. For example, buyer 20 may request that the matching products be listed in order from least expensive to most expensive.

GCD 42 may also sort search results according to content type. For example, GCD 42 may sort search results such that products for which data was received from repository 34 may be presented to buyer 20 first, products for which data was received from seller databases 32 containing certified content (meaning content known to match the schema and ontologies of GCD 42) may be presented second, and products for which data was received from seller databases 32 for which there is no content certification may be presented third. Content may be certified, for example, by the entity that operates GCD server 40 or a third party familiar with the schema and ontologies of GCD 42. Within each of these data groups, products may be listed in any suitable order, such as in order of price or any other suitable attribute. For example, search results may be displayed such that products for which data was received from repository 34 may be presented first in order of price, products for which data was received from seller databases 32 containing certified content may be presented second in order of price, and products for which data was received from seller databases 32 for which there is no content certification may presented third in order of price. Although particular examples of displaying search results have been described, search results may be displayed in any suitable order and may be sorted according to any suitable criteria.

Buyer 20 may select a product from the product listing to indicate a desire to initiate a transaction involving the product, such as a purchase of the product. On such a selection, GCD 42 may communicate a repository identifier (RID) identifying the selected seller 30 and a globally unique identifier (GUID) for the product to buyer 20. For example, an RID may be the network address (such as an IP address) of a seller network node 30 or may be associated with the network address in a table (in which case GCD 42 may use the RID to look up the associated network address and then communicate the network address to buyer 20). Buyer may access the seller 30 using the RID (or network address) and request a transaction regarding the product using the GUID. GCD 42 may even provide a link including a URL of a web site associated with the seller 30 or may provide another appropriate method for buyer 20 to be connected to seller 20. Although only a single example arrow (between buyer 20n and seller 30n) is shown to illustrate communication between buyers 20 and sellers 30, it should be understood that any buyer 20 may communicate with any seller 30 to conduct appropriate transactions.

Search queries, sort requests, the presentation of search results to buyers 20, and the selection of search results by buyers 20 may provide information useful to sellers 30 in gauging the market impact of their offerings, their product data and seller data, and other aspects of their business. Accordingly, GCD server 40 may record information regarding search queries, sort requests, the presentation of search results to buyers 20, and the selection of search results by buyers 20 and communicate that information, for a fee or otherwise, to sellers 30. Although an example environment including GCD server 40 is particularly described herein, the present invention is not limited to such an environment, but contemplates any environment wherein a buyer may access data for one or more products available from one or more sellers through queries and the like. In one embodiment, when data for one or more products of a seller 30 is communicated from seller databases 32 and/or repository 34 in response to a search query from search interface 45, GCD server 40 may record information regarding the search query, the presentation of the search results to buyer 20, and/or the selection of a search result by buyer 20 and provide the information to seller 30. Any suitable information associated with the search query, the presentation of the search results to buyer 20, and/or the selection of a search result by buyer 20 may be recorded by GCD server 40 and provided to seller 30. For example, GCD server 40 may record and communicate, make available to, or otherwise provide to seller 30 one or more search criteria specified in the search query. Such criteria may include one or more product attribute values and/or seller attribute values and, as described above, may be provided by buyer 20 or generated automatically according to a buyer profile for buyer 20.

GCD server 40 may also record and provide to seller 30 information regarding the order of display of the search results presented to buyer 20. Reference to "providing" information to seller 30 is meant to encompass communicating the information to seller 30, storing the information for later access by seller 30, or otherwise making the information available to seller 30, as appropriate. Such information may include the actual order of display of the search results. Such information may also include the sort criteria used to sort the results for presentation in a desired order of display. As described above, sort criteria may include product attributes, product attribute values, seller attributes, seller attribute values, or any other criteria for sorting search results. These sort criteria may be default sort criteria used for certain types of searches, sort criteria specified by buyer 20 in a sort request, sort criteria generated automatically based on a buyer profile, or any other criteria used to place the search results in a certain order for presentation to buyer 20. Although particular examples of displaying search results have been described herein, the present invention contemplates search results being sorted according to any suitable criteria and being displayed in any suitable order.

GCD server 40 may also record and provide to seller 30 information regarding the placement of the products of seller 30 in the search results presented to buyer 20. For example, GCD server 40 may record the position of the products of seller 30 in a list of search results sorted according to one or more sort criteria, as described above, and presented to buyer 20. Similarly, GCD server 40 may record information regarding the reasons for the particular placement of the products of seller 30 in the search results presented to buyer 20. Such information may include a comparison of the products of seller 30 with the sort criteria applied to the search results or the order of display, information regarding the products placed ahead of the products of seller 30 in the search results, or any other information that may tend to explain the placement of the products of seller 30 in the search results relative to other products. Providing a seller 30 this kind of information may allow seller 30 to better identify aspects of its offerings (including product and seller attribute values and the quality of seller and product data describing its offerings) that may improve the visibility of their offerings relative to other search results presented to a buyer 20.

Furthermore, GCD server 40 may record and provide to seller 30 information regarding the search results considered by buyer 20. Reference to consideration of one or more search results by buyer 20 encompasses an opportunity for consideration provided to buyer 20 and is not limited to actual consideration. Such information may include the number of results considered by buyer 20. In one embodiment, GCD server 40 may determine this number based on how far down the list of search results (if the search results were presented in a list) buyer 20 scrolled before selecting a suitable product from the list. This number may also be determined based on the number of search result "sets" presented to buyer 20. For example, buyer 20 may be presented a specified number of the search results at a time. In this case, GCD server 40 may record the number of sets buyer 20 viewed before making a selection. GCD server 40 may also record and provide to seller 30 whether buyer 20 viewed data for the products of seller 30, which may be determined based on whether the products of seller 30 were placed ahead of the product selected by buyer 20 in the search results or whether the products of seller 30 were in one of the search result sets presented to buyer 20. Additionally, GCD server 40 may record and provide to seller 30 information regarding products that buyer 20 considered, but did not select. Such information may include information (such as product and seller attribute values) regarding products placed ahead of the selected product in the search results which may have been considered by buyer 20.

Moreover, GCD server 40 may record and provide to seller 30 information regarding the product selected by buyer 20 from the search results. Such information may include the placement of the selected product in the search results and the reasons for the placement of the selected product in the search results. In certain embodiments, some information regarding the product selected by buyer 20 may be confidential in that it may not be disclosed to other sellers 30. For example, the prices of products offered by a seller 30 may be kept in confidence from other sellers 30. In this case, the price of the selected product may be withheld from seller 30, but seller 30 may be informed that the price of the selected product was lower than the prices of the products of seller 30 in the search results. GCD server 40 may also record and provide to seller 30 information regarding the reasons why the products of seller 30 were not placed where the selected product was placed in the search results presented to buyer 20. Such information may include a comparison of the selected product with the products of seller 30 pointing out the differences between them. Any other suitable information regarding the product selected by buyer 20 from the search results may also be recorded and provided to seller 30 by GCD server 40.

Providing seller 30 information regarding the product selected by buyer 20 in this way may allow seller 30 to better identify aspects of its offerings (such as, for example, product attribute values, seller attribute values, product data quality, and seller data quality) that may be modified to improve the marketing of certain of the products of seller 30. As an example, such information may indicate to seller 30 that the marketability of the products of seller 30 may be improved by providing buyers 20 product data or seller data that is not currently available from seller 30 or by using product data from repository 34 or having its product and seller data certified to increase the visibility of its products in product searches (where search results are grouped according to the certification level of the associated data). Other suitable information (such as, for example, information regarding the order of display of the search results presented to buyer 20 and information regarding the placement of the products of seller 30 in the search results presented to buyer 20) may also indicate the same to seller 30. In addition to information regarding the selected product, GCD server 40 may record and provide to seller 30 information regarding the transaction into which buyer 20 entered after selecting a search result. Such information may include the amount of money that changed hands, the size of the order (in terms of, for example, the number of products involved), the size of the buyer, the size of the seller, and other suitable information regarding the transaction. By providing seller 30 this information, GCD server 40 may give seller 30 a "picture" of the marketplace and allow seller 30 to more effectively focus on particular market segments.

GCD server 40 may communicate feedback for a seller 30 as the feedback is generated, periodically in batch mode, or both. For example, feedback may be communicated to seller 30 every time product data for one or more products of seller is presented to a buyer 20 and buyer 20 selects another product and/or enters into a transaction with another seller 30. Feedback may, instead or in addition, be stored as it is generated and compiled for subsequent access by seller 30 so that seller 30 may gauge the market impact of its offerings, its product data and seller data, and other aspects of its business over a period of time or a number of e-commerce transactions.

FIG. 5 illustrates an example method for providing a seller 30 market feedback associated with an e-commerce transaction. The method begins at step 100, where a search query is communicated from search interface 45 to selected seller databases 32 and/or repository 34. At step 102, GCD server 40 records the search criteria specified in the query. As described above, such criteria may include product and seller attribute values and other suitable criteria for identifying a subset of products catalogued using GCD 42. At step 104, seller databases 32 and/or repository 34 communicate search results to GCD server 40 in response to the search query communicated at step 100. GCD server 40 sorts the search results at step 106 and presents the sorted search results to buyer 20 at step 108. As described above, sort criteria may include product attributes, product attribute values, seller attributes, seller attribute values, data quality, or any other criteria for sorting search results. These sort criteria may be default sort criteria used for certain types of searches, sort criteria specified by buyer 20 in a sort request, sort criteria generated automatically based on a buyer profile, or any other criteria used to place the search results in a certain order for presentation to buyer 20. At step 110, GCD server 40 records the sort criteria used to place search results in the desired order of display. GCD server 40 also records, at step 112, the placement of one or more products of seller 30 in the search results presented to buyer 20.

At step 114, buyer 20 selects a search result. GCD server 40, at steps 116-120, may record the number of search results reviewed by buyer 20, the placement of the search result selected by buyer 20, and/or the product and seller attribute values of the selected search result. As described above, certain information regarding the selected search result may be withheld from seller 30. Accordingly, GCD server 40 may record information regarding the selected search result without disclosing information to be kept in confidence from other sellers 30. For example, GCD server 40 may record that the selected search result was priced lower than the products of seller 30 that were included in the search results, instead of recording the actual price of the selected search result. At step 122, buyer 20 enters the transactional phase of the e-commerce transaction, which is concluded at step 124. During the transactional phase, as described above, buyer 20 and the selected seller 30 may negotiate a contract for the sale of the product (which may involve, for example, more clearly defining the subject of the transaction, negotiating a price, and reaching an agreement on supply logistics) and generate a legal document embodying the terms of the negotiated contract. From the transactional phase (which may simply involve, for example, a mouse "click" indicating consummation of the transaction), GCD server 40 may record, at step 126, the dollar value of the transaction between buyer and selected seller and number of products involved. At step 128, GCD server 40 stores the recorded information for later communication to or access by seller 30, and the method ends.

Although the example method illustrated in FIG. 5 describes certain kinds of information regarding an e-commerce transaction being recorded and stored for seller 30, any suitable information regarding an e-commerce transaction may be recorded for use by seller 30 in identifying modifications to the offerings of seller 30 that may improve the marketing of the products of seller 30. Additionally, GCD server 40 may record less than all of the information described above in reference to FIG. 5. For example, GCD server 40 may record only information from the matching phase of the e-commerce transaction, such as information from the search query, the sorting and display of the search results, and the selection of a search result by buyer 20. Information from the transactional phase of the e-commerce transaction may not be recorded. Moreover, any suitable component or combination of components internally or externally associated with GCD server 40 may record and store information as described above. Furthermore, although an example environment including GCD server 40 has been particularly described herein, the present invention is not limited to such an environment, but contemplates any environment wherein a buyer may access data for one or more products available from one or more sellers through queries and the like.

Although the present invention has been described with several embodiments, divers changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A non-transitory computer-readable medium embodied with software, the software when executed using one or more computers programmed to:
   access a global content directory programmed to execute a search in one or more databases for product data and provide a directory of products using a directory structure in which products are organized using a hierarchical classification system, wherein the product data is not stored in the global content directory, a seller database location of the product data for products contained in a product class identified by a pointer that corresponds to the product class;
   access a translation mechanism configured to convert the product data not stored in the global content directory and stored in the storage location identified by a pointer that corresponds to a product class using non-uniformly formatted attribute data associated with the identified product class into uniformly formatted product data used by the global content directory by matching the non-uniformly formatted attribute data corresponding with the product class with the attribute data used by the global content directory;
   record query information based on a search query of one or more seller databases coupled with seller computer systems comprising product data, the search query performed by buyer computer systems;
   record sort request information based on a sort request of at least one of the buyer computer systems and the seller computer systems;
   record presentation information based on the manner in which two or more search results are presented to the buyer computer system, wherein presentation information comprises an order of results or one or more criteria used to order the results, each search result comprising data for a product matching one or more search criteria specified in the search query, the search results comprising one or more of the two or more search results reflecting product data for a particular seller computer system;
   record selection information based on selection by the buyer computer system of a particular search result from among the two or more search results, the particular search result comprising data for a particular product matching one or more search criteria specified in the search query, wherein the particular product is a product of a seller computer system other than the particular seller computer system;
   sort the particular search result with sort criteria comprising at least one of product attributes, product attribute values, seller attributes, seller attribute values, and data quality;
   provide the recorded query information and at least one of the presentation information and the selection information to the particular seller computer system, such that the particular seller computer system has access to one or more aspects of its product data relative to product data of other seller computer systems;
   facilitate a negotiated transaction between at least one of the buyer computer systems and the seller computer systems using one or more unique identifiers for the product and one or more unique identifiers for the seller computer system;
   record negotiated transactional information associated with the negotiated transaction, wherein the negotiated transactional information comprises a dollar value of the transaction, a number of products in the transaction, a size of the buyer computer system, a size of the seller computer system, a negotiated subject of the transaction, and terms of a negotiated legal document embodying the transaction;
   provide the negotiated transactional information to one or more seller computer systems involved in the transaction and to one or more other seller computer systems; and
   cause the particular seller computer system to modify one or more aspects of its product data of the particular seller computer system to be modified based, at least in part, on the provided recorded query information and negotiated transactional information.

2. The non-transitory computer-readable medium of claim 1, further comprising a shared product data repository comprising product data for two or more products available from two or more seller computer systems.

3. The non-transitory computer-readable medium of claim 1, wherein the software is further programmed to provide information to the particular seller computer system by communicating the information to the particular seller computer system substantially immediately following the selection of the particular search result by the buyer computer system.

4. The non-transitory computer-readable medium of claim 1, wherein the software is further programmed to record contract information reflecting one or more terms of a contract between the buyer computer system and a second seller computer system following the selection of the particular search result by the buyer computer system, the particular search result reflecting product data of the second seller computer system.

5. The non-transitory computer-readable medium of claim 1, wherein the query information reflects one or more product attribute values and one or more seller attribute values specified in the search query.

6. The non-transitory computer-readable medium of claim 1, wherein:
   the presentation information reflects a position of a search result for the particular seller computer system within an ordered display of the two or more search results; and
   the selection information reflects a position of the selected search result within the ordered display of the two or more search results.

7. The non-transitory computer-readable medium of claim 1, wherein the presentation information reflects one or more buyer-specified sort criteria used to sort the two or more search results, each sort criterion selected from the group consisting of a product attribute, a product attribute value, a seller attribute, and a seller attribute value.

8. The non-transitory computer-readable medium of claim 1, wherein the selection information reflects at least one of:
the number of search results considered by the buyer computer system; and
whether the buyer computer system considered one or more of the two or more search results for the particular seller computer system.

9. The non-transitory computer-readable medium of claim 8, wherein the selection information reflects at least one of:
one or more product attribute values or seller attribute values for one or more of the two or more search results for the particular seller computer system considered but not selected by the buyer computer system; and
one or more product attribute values or seller attribute values for the search result selected by the buyer computer system.

10. The non-transitory computer-readable medium of claim 9, wherein the selection information excludes product attribute values and seller attribute values for the search result selected by the buyer computer system that are to be kept in confidence from seller computer systems other than the seller computer system based on the selected search result.

11. The non-transitory computer-readable medium of claim 1, wherein the selection information reflects at least one of:
a position of the selected search result within the two or more search results presented to the buyer computer system; and
one or more reasons for the position, relative to the search result selected by the buyer computer system, of a search result for the particular seller computer system.

12. A computer-implemented method, comprising:
accessing a global content directory programmed to execute a search in one or more databases for product data and provide a directory of products using a directory structure in which products are organized using a hierarchical classification system, wherein the product data is not stored in the global content directory, a seller database location of the product data for products contained in a product class identified by a pointer that corresponds to the product class;
accessing a translation mechanism configured to convert the product data not stored in the global content directory and stored in the storage location identified by a pointer that corresponds to a product class using non-uniformly formatted attribute data associated with the identified product class into uniformly formatted product data used by the global content directory by matching the non-uniformly formatted attribute data corresponding with the product class with the attribute data used by the global content directory;
recording query information based on a search query of one or more seller databases coupled with seller computer systems comprising product data, the search query performed by buyer computer systems;
recording sort request information based on a sort request of at least one of the buyer computer systems and the seller computer systems;
recording presentation information based on the manner in which two or more search results are presented to the buyer computer systems, wherein presentation information comprises an order of results or one or more criteria used to order the results, each search result comprising data for a product matching one or more search criteria specified in the search query, the two or more search results comprising one or more of the two or more search results reflecting product data for a particular seller computer system;
recording selection information based on selection by the buyer computer systems of a particular search result from among the two or more search results, the particular search result comprising data for a particular product matching one or more search criteria specified in the search query, wherein the particular product is a product of a seller computer system other than the particular seller computer system;
sorting the particular search result with sort criteria comprising at least one of product attribute values, seller attributes, seller attribute values, and data quality;
providing the recorded query information and at least one of the presentation information and the selection information to the particular seller computer system, such that the particular seller computer system has access to one or more aspects of its product data relative to product data of other seller computer systems;
facilitating a negotiated transaction between at least one of the buyer computer systems and the seller computer systems using one or more unique identifiers for the product and one or more unique identifiers for the seller computer system;
recording negotiated transactional information associated with the negotiated transaction, wherein the negotiated transactional information comprises a dollar value of the transaction, a number of products in the transaction, a size of the buyer computer system, a size of the seller computer system, a negotiated subject of the transaction, and terms of a negotiated legal document embodying the transaction;
providing the negotiated transactional information to one or more seller computer systems involved in the transaction and to one or more other seller computer systems; and
causing the particular seller computer system to modify one or more aspects of its product data based, at least in part, on the provided recorded query information and negotiated transactional information.

13. The method of claim 12, further comprising a shared product data repository comprising product data for two or more products available from two or more seller computer systems.

14. The method of claim 12, wherein providing information to the particular seller computer system comprises communicating the information to the particular seller computer system substantially immediately following the selection of the particular search result by the buyer computer system.

15. The method of claim 12, further comprising recording contract information reflecting one or more terms of a contract between the buyer computer system and a second seller computer system following the selection of the particular search result by the buyer computer system, the particular search result reflecting product data of the second seller computer system.

16. The method of claim 12, wherein the query information reflects one or more product attribute values and one or more seller attribute values specified in the search query.

17. The method of claim 12, wherein:
the presentation information reflects a position of a search result for the particular seller computer system within an ordered display of the two or more search results; and
the selection information reflects a position of the selected search result within the ordered display of the two or more search results.

18. The method of claim 12, wherein the presentation information reflects one or more buyer-specified sort criteria used to sort the two or more search results, each sort criterion selected from the group consisting of a product attribute, a product attribute value, a seller attribute, and a seller attribute value.

19. The method of claim 12, wherein the selection information reflects at least one of:
the number of search results considered by the buyer computer system; and
whether the buyer computer system considered one or more of the two or more search results for the particular seller computer system.

20. The method of claim 19, wherein the selection information reflects at least one of:
one or more product attribute values or seller attribute values for one or more of the two or more search results for the particular seller computer system considered but not selected by the buyer computer system; and
one or more product attribute values or seller attribute values for the search result selected by the buyer computer system.

21. The method of claim 20, wherein the selection information excludes product attribute values and seller attribute values for the search result selected by the buyer computer system that are to be kept in confidence from seller computer systems other than the seller computer system based on the selected search result.

22. The method of claim 12, wherein the selection information reflects at least one of:
a position of the selected search result within the two or more search results presented to the buyer computer system; and
one or more reasons for the position, relative to the search result selected by the buyer computer system, of a search result for the particular seller computer system.

23. An electronic commerce system, including one or more computers coupled with one or more databases, comprising:
a global content directory programmed to execute a search in the one or more databases for product data and provide a directory of products using a directory structure in which products are organized using a hierarchical classification system, wherein the product data is not stored in the global content directory, a seller database location of the product data for products contained in a product class identified by a pointer that corresponds to the product class;
a translation mechanism configured to convert the product data not stored in the global content directory and stored in the storage location identified by a pointer that corresponds to a product class using non-uniformly formatted attribute data associated with the identified product class into uniformly formatted product data used by the global content directory by matching the non-uniformly formatted attribute data corresponding with the product class with the attribute data used by the global content directory,
wherein the global content directory is further configured to:
record query information based on a search query of one or more seller databases coupled with seller computer systems comprising product data, the search query performed by buyer computer systems;
record sort request information based on a sort request of at least one of the buyer computer systems and the seller computer systems;
record presentation information based on the manner in which two or more search results are presented to the buyer computer system, wherein presentation information comprises an order of results or one or more criteria used to order the results, each search result comprising data for a product matching one or more search criteria specified in the search query, the search results comprising one or more of the two or more search results reflecting product data for a particular seller computer system;
record selection information based on selection by the buyer computer system of a particular search result from among the two or more search results, the particular search result comprising data for a particular product matching one or more search criteria specified in the search query, wherein the particular product is a product of a seller computer system other than the particular seller computer system;
sort the particular search result with sort criteria comprising at least one of product attributes, product attribute values, seller attributes, seller attribute values, and data quality;
provide the recorded query information and at least one of the presentation information and the selection information to the particular seller computer system, such that the particular seller computer system has access to one or more aspects of its product data relative to product data of other seller computer systems;
facilitate a negotiated transaction between at least one of the buyer computer systems and the seller computer systems using one or more unique identifiers for the product and one or more unique identifiers for the seller computer system;
record negotiated transactional information associated with the negotiated transaction, wherein the negotiated transactional information comprises a dollar value of the transaction, a number of products in the transaction, a size of the buyer computer system, a size of the seller computer system, a negotiated subject of the transaction, and terms of a negotiated legal document embodying the transaction;
provide the negotiated transactional information to one or more seller computer systems involved in the transaction and to one or more other seller computer systems; and
cause the particular seller computer system to modify one or more aspects of its product data of the particular seller computer system to be modified based, at least in part, on the provided recorded query information and negotiated transactional information.

24. The system of claim 23, wherein the product data identified by the pointer corresponds to a user-selected product class.

25. The system of claim 23, wherein the product data identified by the pointer corresponds to an automatically selected product class.

26. The system of claim 23, wherein the global content directory returns a network location of a database to a buyer computer system.

27. The system of claim 23, wherein the one or more computers further comprises a product data repository comprising static product data.

28. The system of claim 27, wherein the static product data in the product data repository is linked with at least one set of dynamic product data in at least one seller database.

29. The system of claim 27, wherein the product data repository comprises multiple storage locations.

30. The system of claim 23, wherein a seller computer system requests that the static product data in the product data repository be associated with the seller computer system and at least one of the seller computer systems products after the seller computer system has queried the global content directory server to determine if the repository includes static product data for the at least one of the seller computer systems products.

* * * * *